United States Patent Office 3,554,786
Patented Jan. 12, 1971

3,554,786
METHOD FOR PREPARING AN ELEMENT HAVING A SUBSTRATE COATED WITH A PRESSURE-INSENSITIVE, CLOSED-MICROCELLED COMPOSITION
Erwin Paul Lieberman, Wilmington, Del., assignor to E. I. du Pont de Nemours and Company, Wilmington, Del., a corporation of Delaware
No Drawing. Filed Aug. 28, 1967, Ser. No. 663,521
Int. Cl. B44d 1/092; D21h 1/28, 1/38
U.S. Cl. 117—60                                    4 Claims

ABSTRACT OF THE DISCLOSURE

A method for coating a substrate such as paper with a mixture of a water-soluble proteinaceous such as paper with a mixture of a water-soluble proteinaceous binder and an elastomeric latex having a cell-forming liquid with a boiling point less than 100° C. imbibed in the mixture and drying the applied coating. The dried coating is an essentially closed-microcelled, pressure-insensitive coating.

BACKGROUND OF THE INVENTION

High quality paper such as that used for books and magazines is normally coated to give it a bright, white surface that accepts printing ink well. Conventional coatings consist of a starch and/or casein binder with a high proportion of pigments such as clay, titanium dioxide, and the like. Coated papers of this type are extraordinarily heavy, and great expense is incurred in the handling and shipping of books and magazines printed on conventional coated paper.

A number of attempts have been made to provide a lighter weight coating for paper that is as satisfactory as conventional pigmented coatings. The most fruitful approach prior to the present invention, has been to employ a resinous coating that contains microscopic voids having dimensions of the order of one micron. The multitudinous air-solid interfaces of such a coating have the property of refracting and reflecting light in such a manner that an opaque, white appearance results, much like that of a white pigmented coating. Such a lightweight coating is described, for example, in U.S. Pats. 3,157,533 and 3,108,009. This coating is formed from a colloidal dispersion or emulsion of a high-boiling, water immiscible solvent such as toluene or xylene in an aqueous dispersion of casein or other polymeric resin. When this emulsion is coated on paper, dried to form a resinous matrix in which the microscopic globules of a solvent are dispersed, and finally heated, evaporation of the solvent ruptures the film, forming a network of microscopic fissures and crevices in the resinous matrix that produce the desired light-reflecting character of the final coating.

Lightweight coatings of the above-described prior art type, while adequate in brightness and opacity, have the great disadvantage of being sensitive to collapse under pressure. Thus, even the accidental stroke of a fingernail across the surface is able to destroy the air-resin interfaces producing a dark streak. For this reason the prior art lightweight paper coatings have not been accepted by the publishing trade for the uses now met by pigment-coated papers.

DESCRIPTION OF THE INVENTION

My invention provides a lightweight, printable coating for paper that is not subject to marking under pressure. I have discovered that such a coating can be achieved by forming a microcellular, essentially closed-cell polymeric film on a substrate, such as paper, the closed cells being of such dimension as to impart desired light-reflective properties to the coated substrate. This pressure-insensitive coating will be from about 0.5 to about 2.0 mils thick and is the dried residue of a water-borne film-forming polymeric composition, said coating having uniformly dispersed therein closed cells less than ten microns, preferably less than one micron, in diameter, said cells being formed by the expansion of a volatile liquid having a boiling point less than 100° C. imbibed in said water-borne polymeric composition prior to coating the substrate.

The polymeric matrix substance of the coatings of this invention can be any one of a gret variety of water-dispersible or water soluble substances, or a combination of such substances that provides the necessary degree of flexibility and resistance to collapse under pressure. Casein, starch, and alpha protein, the conventional binders for pigmented paper coatings, are useful water-soluble components of the coatings of this invention because they have the desirable property of becoming relatively water-resistant after drying. However, they are too stiff and brittle to be used as the sole component of the polymeric matrix, and it has been found desirable to combine these nautral products with colloidal dispersions, or latices, of elastomeric or semielastomeric polymers. Representative examples of the latter are the synthetic diene polymers and copolymers such as polybutadiene, polyisoprene, polychloroprene, styrene-butadiene rubber (SBR), the more resinous high-styrene SBR product, styrene-chloroprene copolymers, vinyl chloride copolymers, chlorinated polyolefins, the styrene-butadiene-acrylonitrile copolymers, ethylene-propylene (EPR and EPDM) rubbers, and the like. As one example, a 75% styrene-25% butadiene copolymer in latex form has been found to have a good combination of flexibility and resistance to deformation. It is understood, of course, that polymers suitable for the practice of this invention can be selected from any of a great variety of chemical types by those skilled in the polymer art.

The volatile liquid that acts as the cell-forming constituent should have a boiling point less than that of water and must be chemically compatible with the elastomeric polymer component of the coating composition. It is also desirable that it be nontoxic and nonflammable, so that it can be safely used in commercial practice. These requirements are best met by the low molecular weight halogenated solvent such as methylene chloride, methyl and ethyl chloride, and especially by the fluorine-containing liquids such as fluorodichloromethane, difluorodichloromethane, trichlorofluoromethane, difluorotetrachloroethane, trifluorotrichloroethane, perfluorocyclobutane, and the like.

The coating compositions used in applying the coatings of this invention are prepared by mixing the water-soluble resinous component, if used, the polymeric latex, additional water and solubilizing agents if necessary, and the volatile liquid in a closed container for a long enough period for the volatile liquid to be imbibed in the polymeric component. This may require a few hours or one or more days, depending on the particular components being employed.

It is also possible to include minor amounts of inert pigments in the composition if desired, up to 20 parts by weight per 100 parts of the film-forming components.

Suitable substrates for coating with the compositions of this invention are most generally cellulosic papers, or boards such as box board or poster board stocks, although the invention is not limited to cellulosic substrates. Synthetic and regenerated polymeric sheets and films may serve as the substrate, as well as metal foils such as those used in the packaging arts. My invention is particularly applicable wherever a lightweight, opaque, relatively pigment-free coating is desired.

It may be necessary, depending on the formulation of the coating composition, to pretreat the substrate with a coagulating agent. Inorganic salts of the kinds normally used in forming dipped latex films, e.g., calcium nitrate, aluminum sulfate, zinc chloride, and so on, are the usual agents. Sodium chloride has been found to be satisfactory in many cases. The salt is applied to the substrate as an aqueous solution, at any convenient time before application of the coating composition.

It is not necessary to treat the substrate with a coagulating agent if the coating composition is suitable sensitized before application to the substrate by procedures well known to those skilled in the emulsion art. For instance, the alkaline reserve of coatings based on an anionic elastomer latex can be reduced to a point just short of coagulation by addition of an acid such as acetic acid. Alternatively, small amounts of coagulating agents such as alum or other salts can be added just before the coating step, so that coagulation takes place as a result of absorption of water by the substrate or on evaporation of water from the coating.

The practice of this invention is more particularly illustrated by the following examples, in which parts are given by weight; these examples are representative.

EXAMPLE 1

To 156 parts of 75% styrene-25% butadiene copolymer latex (48% solids) (Dow Latex 512-K) is added 250 parts of a 10% aqueous solution of ammonium caseinate and 50 parts of fluorotrichloromethane (B.P. 24° C.). The mixture is sealed in a glass jar and slowly rolled for about 16 hours to allow intimate mixing of the ingredients. A sheet of bond paper is coated with a 20% solution of sodium chloride in distilled water by means of a drawdown knife at a wet film thickness of approximately two mils. The paper is allowed to dry at 25° C. The latex-caseinate-fluorocarbon mixture is then applied with a drawdown knife on the salt coated paper at a wet thickness of four mils. The coated paper is immediately placed in a circulating air oven and dried for five minutes at 100° C. The dry thickness of the coating is 1-1.5 mils.

Microscopic examination at 100 times magnification shows that the coating has a closed cell structure. The smallest cells visible are two microns in diameter; the largest, about 100 microns.

The coated paper is subjected to 10,000 p.s.i. pressure in a hydraulic press. Reexamination of the coating at 100× shows no change in the microcellular structure. The coated paper is also subjected to the back of a thumbnail being drawn slowly across it using sufficient pressure to bend the thumbnail. Microscopic examination of the coating shows that the largest cells (e.g., 100 microns) are ruptured, but the paper fiber is not visible, indicating that most of the cells have withstood collapse.

EXAMPLE 2

Following the procedure of Example 1, a composition prepared from 104 parts of 75% styrene-25% butadiene copolymer latex (48% solids), 500 parts of 10% aqueous ammonium caseinate, and 10 parts of fluorotrichloromethane gives a paper coating containing closed cells ranging from 2 to 10 microns in diameter.

EXAMPLE 3

The procedure of Example 2 is repeated, using as the volatile liquid the following agents:

| | Boiling point, ° C. | Parts |
|---|---|---|
| Difluorodibromomethane | 25° | 11 |
| Trifluorotrichloroethane | 48° | 15 |
| Difluorotetrachloroethane | 93° | 15 |

Each coating made contains closed cells ranging from 2 to 10 microns in diameter, but that from the composition containing difluorotetrachloroethane has fewer cells than those made with the lower boiling point liquids.

EXAMPLE 4

The following ingredients are combined using the method described in the preceding examples:

| | Parts |
|---|---|
| Neoprene Latex 400 | 90 |
| Ammonium caseinate | 10 |
| Fluorotrichloromethane | 10 |
| Azodicarbonamide ("Celogen" AZ [1]) | 0.10 |
| Water, to give 20% solids. | |

[1] Naugatuck division, U.S. Rubber Co.

The mixture is applied to bond paper which has been previously coated with a 10% aqueous solution of magnesium sulfate heptahydrate as a coagulant. The latex coating as applied and dried as in the previous examples.

Microscopic examination of the dried coating at 645× magnification shows cells of 2–10 microns diameter.

Similar results are obtained when starch is substituted for casein component of the above examples, and when other elastomeric polymers are used.

EXAMPLE 5

To 152 parts of polychloroprene latex (59% polymer solids by weight, Neoprene Latex 601A) is slowly added 100 parts of a 10% solution of ammonium caseinate, 16.5 parts of an aqueous dispersion of zinc oxide (60% solids by weight) and 100 parts of water under slow agitation. To this mixture is added an emulsion consisting of:

| | Parts |
|---|---|
| Trifluorotrichloroethane (Freon 113, B.P. 48° C.) | 90 |
| Duponol OS (amine salt of a long chain unsaturated alcohol sulfate) | 10 |
| Water | 100 |

For each 100 parts of chloroprene polymer, 11 parts of the above emulsion are added.

A sheet of bond paper is pretreated with a 10% solution of epsom salts in water containing small amounts of Colloid 619 as a wetting agent. Colloid 619 is a proprietary antifoaming agent made by Colloids, Inc., of Newark, N.J. When the paper is thoroughly dried a film of the polymer/casein mixture of approximately two wet mils thickness is applied. The paper is immediately placed in a circulating air oven at 100° C. for five minutes.

Examination of the film at 645× magnification reveals a closed cell structure. The cells are 5–10 microns in diameter.

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are as follows:

1. A method for preparing an element having a substrate coated with a pressure-insensitive, closed-microcelled coating composition by:
   (a) applying to a substrate a polymeric composition of water-soluble proteinaceous binder, an elastomeric latex and a cell-forming liquid having a boiling point less than 100° C. imbibed in the mixture, and
   (b) drying the coating composition.

2. The method of claim 1 wherein said substrate has been pretreated with coagulant.

3. The method of claim 1 in which the cell-forming liquid is taken from the group consisting essentially of methylene chloride, methyl chloride, ethyl chloride, fluorodichloromethane, difluorodichloromethane, trichlorofluoromethane, difluorotetrachloroethane, trifluorotrichloroethane and perfluorocyclobutane.

4. The method of claim 1 wherein the coating composition contains up to 20 parts of inert pigment per 100 parts by weight of coating composition.

References Cited

UNITED STATES PATENTS

| | | | |
|---|---|---|---|
| 2,790,730 | 4/1957 | Trasset | 117—156X |
| 2,950,214 | 8/1960 | Smith | 117—156X |
| 2,961,334 | 11/1960 | Clancy et al. | 117—156X |
| 3,020,176 | 2/1962 | Robinson et al. | 117—156X |
| 3,108,009 | 10/1963 | Clancy et al. | 117—155X |
| 3,157,533 | 11/1964 | Clancy et al | 117—156 |
| 3,224,897 | 12/1965 | Smith | 117—156X |
| 3,309,224 | 3/1967 | Weber | 117—156X |
| 3,372,044 | 3/1968 | Weber | 117—156X |
| 3,372,050 | 3/1968 | Weber | 117—156X |
| 3,427,971 | 2/1969 | Steber et al. | 117—156X |
| 3,227,664 | 1/1966 | Blades et al. | 161—178X |

FOREIGN PATENTS

| | | | |
|---|---|---|---|
| 1,073,943 | 6/1967 | Great Britain | 117—156 |

WILLIAM D. MARTIN, Primary Examiner

M. R. LUSIGNAN, Assistant Examiner

U.S. Cl. X.R.

117—155, 156